United States Patent [19]

Stone

[11] 4,216,587
[45] Aug. 12, 1980

[54] ALIGNMENT INDICATOR CLAMP APPARATUS

[76] Inventor: Willice D. Stone, 1402 Ferdinand St., Plaquemine, La. 70764

[21] Appl. No.: 7,225

[22] Filed: Jan. 29, 1979

[51] Int. Cl.² ............................................. G01B 3/30
[52] U.S. Cl. .................................... 33/180 R; 33/412; 248/DIG. 4; 248/231
[58] Field of Search .................. 33/412, 21 C, 180 R; 248/231, DIG. 4, 230

[56] References Cited

U.S. PATENT DOCUMENTS

| | | | |
|---|---|---|---|
| 2,638,676 | 5/1953 | Callahan | 33/412 |
| 2,726,058 | 12/1955 | Foltz | 33/412 X |
| 3,238,623 | 3/1966 | Lee | 33/21 C |
| 3,525,158 | 8/1970 | Torlay | 33/412 |
| 3,647,171 | 3/1972 | Rafferty | 248/231 X |

*Primary Examiner*—Harry N. Haroian
*Attorney, Agent, or Firm*—James M. Pelton

[57] ABSTRACT

An alignment indicator clamp apparatus for aligning the working shafts of a motor and a piece of equipment in order to couple them together having shaft engaging members connected by a cable passing through the shaft engaging members and through a cable tightening mechanism and having at least one indicator mounting post.

5 Claims, 3 Drawing Figures

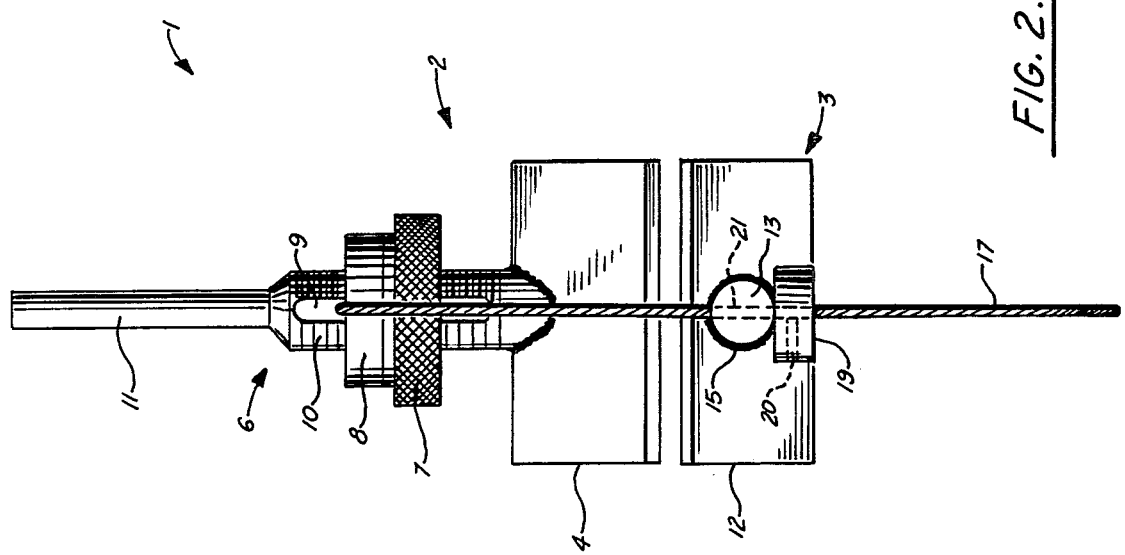
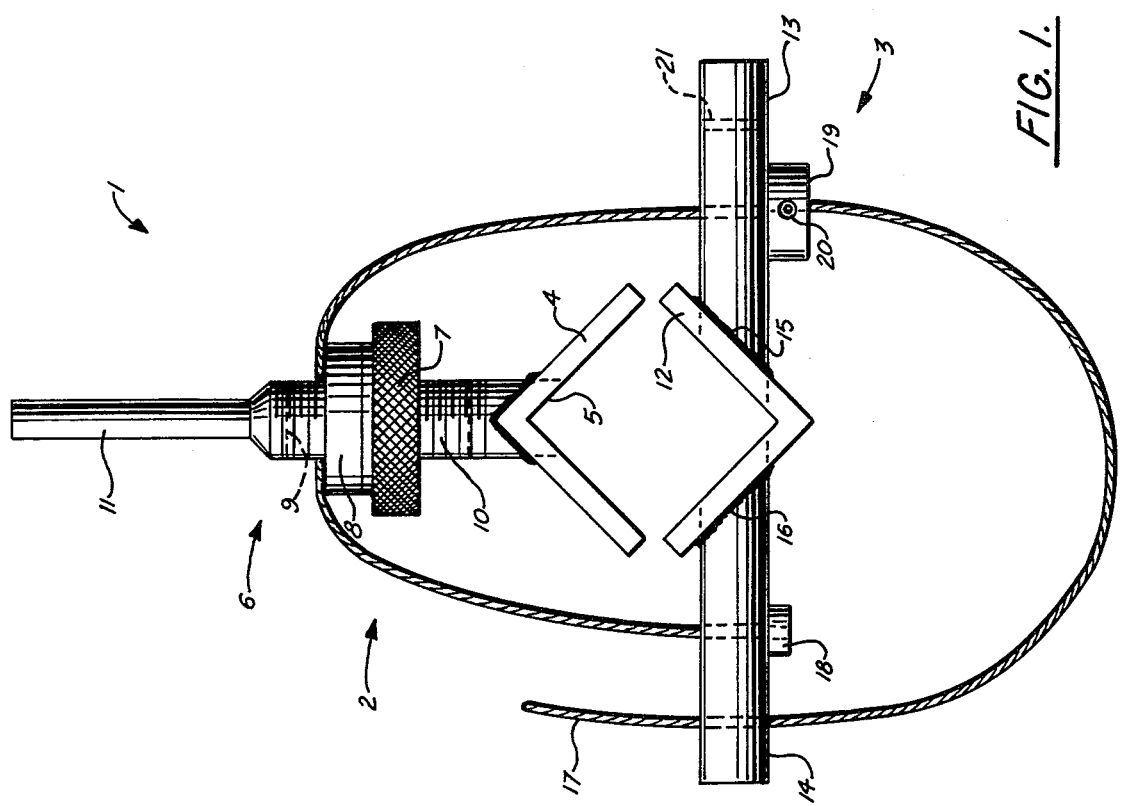

ALIGNMENT INDICATOR CLAMP APPARATUS

BACKGROUND OF THE INVENTION

This invention relates to an apparatus and method for aligning shafts. Particularly, this invention is useful in the new construction or maintenance fields in cases of setting and aligning the working or drive shafts of motors so that they can be coupled to the driven shafts of equipment, such as agitators, pumps, drive shafts, compressors and the like.

Whenever a motor is attached to a piece of equipment to be operated the motor working or drive shaft must be attached to the equipment or driven shaft so that both are in perfect or near perfect alignment. If alignment is unsatisfactory, when the drive and driven shafts are coupled together by known conventional methods, the stresses resulting from operation in coupled misalignment will cause premature bearing failure in the motor or equipment or both. Often such failure will occur before operating speeds are attained in high speed electric motors or soon thereafter in lower speed motors. For these reasons engineering specifications often require alignment both horizontally and vertically of the drive and driven shafts within on thousandth (1/1000) of an inch.

Shaft alignment can be satisfactorily accomplished using a conventional alignment indicator which is fixed to one shaft and rides the other with a spring loaded stem capable of registering differences up to 200,000ths over two full turns on the indicator dial. When the shaft to which the indicator is attached is rotated through 360°, the variation in alignment is read at 90°, 180°, 270° and 360° or 0°. A skilled man can then adjust one of the shafts until alignment indicator readings throughout the 360° rotation are identical or within the specified tolerance. However, in order to have accurate readings, the indicator must be rigidly fixed to one of the shafts. Thus, one of the objects of the present invention is to provide an apparatus which can be rigidly fixed to a shaft to which the alignment indicator can be secured. Another object is to provide an alignment indicator clamp apparatus with more than one shaft engaging member. A further object of this invention is to provide an alignment indicator clamp apparatus which is easily attached and removed from the shaft without special tools. Another object of this invention is to provide an alignment indicator clamp apparatus which can handle shafts of widely varying diameter. A still further object of this invention is to provide an alignment indicator clamp apparatus which can be rigidly fixed to a shaft but is not cumbersome or bulky in size. These and other objects of the invention are accomplished by means of the apparatus of this invention.

SUMMARY OF THE INVENTION

The above and other objects of the invention are accomplished by provision of an alignment indicator clamp apparatus for fixedly attaching an alignment indicator to one of two shafts to be aligned, comprising at least two shaft engaging members for grasping one of two shafts to be aligned, at least one post for attaching said alignment indicator, a cable and a cable tightening mechanism attached to one of said shaft engaging members, said cable having a fixed stop means at one end and a slideably adjustable stop means, whereby in operative attachment to one of the two shafts to be aligned said shaft engaging members are placed substantially equidistant about the circumference of the shaft, said cable is attached at the fixed stop end to one of said shaft engaging members, passed circumferentially around the shaft, through said cable tightening mechanism and at least one other shaft engaging member returning to said first shaft engaging member and being again attached to said first shaft engaging member by said slideably adjustable stop means whereby on activating said cable tightening mechanism the shaft engaging members are firmly fixed to said shaft and said alignment indicator can be attached to the apparatus for use in aligning the two shafts.

DESCRIPTION OF THE DRAWINGS

The clamp apparatus of my invention can be more fully illustrated by reference to the accompanying drawings in which:

FIG. 1 is a front elevation view of my invention with all parts operationally connected.

FIG. 2 is a side elevational view similar to FIG. 1.

DESCRIPTION OF PREFERRED EMBODIMENTS

Figure 3:
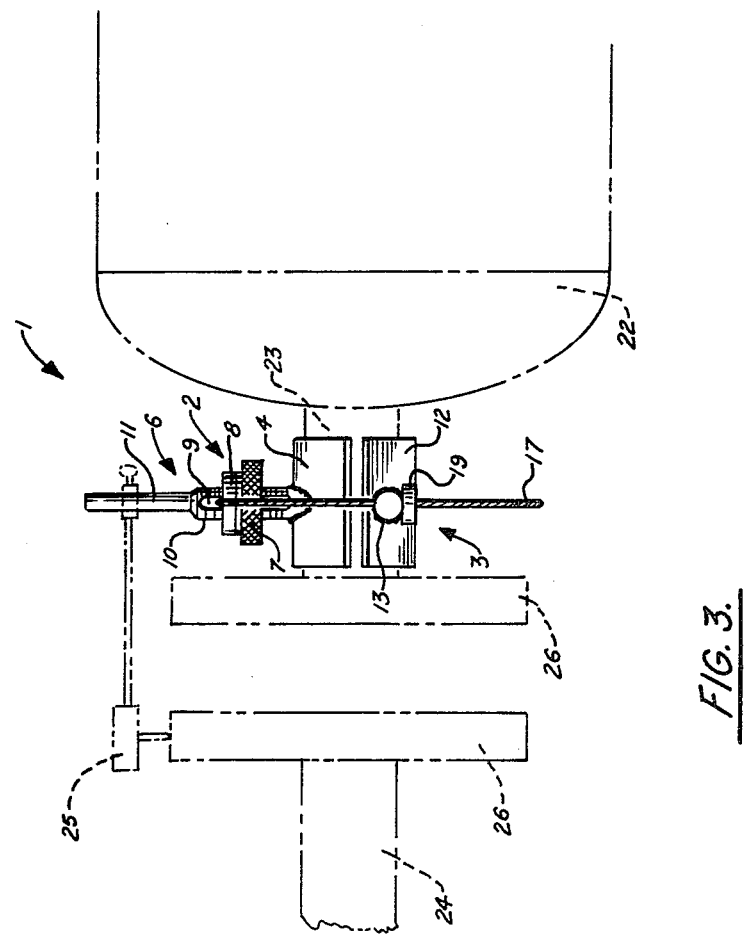
FIG. 3 is a side view similar to FIG. 2 showing my invention as it would be attached in operational form to a motor drive shaft and having an alignment indicator attached thereto for aligning a driven shaft with all conventional and known parts not of my invention shown in phantom.

The proper alignment of motor drive shafts and equipment driven shafts is extremely important as indicated hereinabove. Thus, the use of an alignment indicator has made the determination of the degree of this precise adjustment rather simple to accomplish. Such simple and precise reading of the variations in alignment between a drive and a driven shaft depends upon rigidly fixing the alignment indicator to the drive shaft by means such as my invention. It should be noted that in actuality the indicator can be operated from either the drive or driven shaft but in general it is easier to freely rotate the drive shaft for taking the readings from the indicator.

The clamp apparatus for holding an alignment indicator must meet several seemingly opposing criteria for best results in ordinary use. First, it must be capable of handling various size shafts, but it must also fit each size shaft well. Second, it must be capable of rigid attachment to the shaft, but it must also be able to be attached and detached easily and without special or expensive tools. Third, it must be large and rugged enough to withstand handling in field operations, but it must be small enough to be useful in cramped or small spaces and rotate between clearances of small shafts and adjoining equipment or floors and between shaft couplings and motors. Finally, it must be relatively inexpensive to produce but have the quality of design, materials and construction to provide long service and low maintenance. Other characteristics of my clamp apparatus for an alignment indicator will be apparent from the following description.

Referring to FIGS. 1 and 2, my invention can be seen to reside in an alignment indicator clamp apparatus 1, generally comprising an upper assembly 2 and a lower assembly 3. The upper assembly 3 has upper shaft engaging member 4 which can be a relatively short metal bar having a right angled cross-section or a cross-section of an angle not less than 90°. Although upper shaft engaging member 4 is shown with a 90° angle, such as when a short section of angle iron is employed, other cross-sectional areas can be used such as angle iron having cross-sections with angles up to 135°, semi-circular cross-sections, multi-planar cross-sections and the like. However, for best results and least expense in construction, my invention employs the regular 90° angle metal bar. As further shown in FIG. 1, in the central portion of upper shaft engaging member 4, a hole 5 is drilled for attachment of the cable tightening mechanism 6. Cable tightening mechanism 6 has a partially threaded rod 10 which fits into hole 5 and carries knurled adjustment knob 7, which is threadedly adjustable upwardly or downwardly on rod 10, and bearing washer 8 which is freely moveable without threaded engagement on rod 10 and rides with knob 7. Cable passage slot 9 is cut through rod 10 on an axis normal to the longitudinal axis of the upper shaft engaging member 4 and, thus, to the shaft. Cable passage slot 9 extends for about the entire length of the threaded portion of rod 10. Attached to rod 10 at its upper end is indicator attachment post 11 which can be of the same or smaller cross-section as the threaded portion of rod 10. However, post 11 is preferably machined down to a smaller diameter so that the alignment indicator, not shown in FIGS. 1 and 2, can be easily attached at any convenient point along its length. Post 11 can be as long or longer than threaded section of rod 10, within the constraints of being long enough to allow the indicator to surmount any shaft coupling flange and reach the other coupling or shaft to be connected, but not so long as to be awkward or to prevent shaft rotation through 360° for the necessary alignment indicator measurements to be obtained. In general, it has been found as a preferred embodiment of my invention that rod 10 and post 11 can conveniently be equal in length.

Opposing upper shaft engaging member 4 is lower shaft engaging member 12, which without limiting the invention can have the same general configuration and size as upper shaft engaging member 4. Lower shaft engaging member 12 has attached to it cable holder posts 13 and 14. Cable holder posts 13 and 14 are on the same axis which is generally normal to the longitudinal axis of lower shaft engaging member 12. Although it is not essential, cable holder posts 13 and 14 may be located centrally on the face of each side of lower shaft engaging member 12. These may be attached by holes drilled in the legs of the lower shaft engaging member 12 normal to its longitudinal axis and slightly above the apex of the interior angle so that in manufacture a solid bar can be positioned in the holes generally as shown in FIG. 1, fixed to member 12, such as by welding around the outside of member 12 at the junctions 15 and 16 of bar and member 12 on both sides, the inside portion of the bar can then be cut away flush with the inside surface of member 12 and also fixed in position, again for example as by welding, thus forming cable holder posts 13 and 14. Several vertical holes 21 for passage of cable 17 are located at evenly spaced intervals in cable holder posts 13 and 14.

Cable 17 is provided such that it is small enough to pass through holes 21 and slot 9, yet strong enough to be tightened and hold upper and lower shaft engaging members 4 and 12 fixedly to the shaft. Preferably, a braided or twisted steel cable is useful, but my invention should not be limited thereto. To hold apparatus 1 together rigidly, stop button 18 is permanently fixed to one end of cable 17. Cable 17 is then passed through one of the holes 21, for instance in cable holder post 14, around the shaft through slot 9 and above bearing washer 8, continuing around the shaft and back down through another hole 21 in cable holder post 13. Adjustable cable stop button 19 is then placed on cable 17, drawn hand tight to cable holder post 13 and fixed in position, as for example by tightening set screw 20 in adjustable cable stop button 19. With the clamp apparatus 1 in place on a shaft to be aligned it is only necessary to hand tighten the cable 17 by turning knob 7 so that it proceeds upwardly tightening cable 17 and fixing the apparatus 1 to the shaft.

The manner of using my invention in one mode of operation is illustrated in FIG. 3. Conventional and known items in FIG. 3 are shown in phantom view and may be represented in general and not with the detailed features of my invention as shown in FIGS. 1 and 2. The motor, generally represented by 22 has drive shaft 23 ending in shaft coupling 26. To drive shaft 23 there is attached in the manner described above the alignment indicator clamp apparatus 1 of my invention. Alignment indicator 25 is attached to indicator attachment post 11 while the stem of indicator 25 rides shaft coupling 26 attached to driven shaft 24. When fixedly and rigidly attached to drive shaft 23, the alignment indicator clamp apparatus 1 will turn with the rotation of drive shaft 23 and the indicator 25 will "ride" the coupling. Readings taken after 90°, 180°, 270° and 360° of rotation will readily show one skilled in the art the degree to which the drive shaft 23 and driven shaft 24 are misaligned horizontally. It is also possible to attach indicator 25 to cable holder post 13 or 14 for taking readings on coupling 26, either circumferentially as described, or on its face which will indicate vertical alignment of the drive and driven shafts 23 and 24, respectively.

Having described my invention with respect to the best mode known to me at this time, it should be clear that my invention is not to be considered limited to the structure shown in the embodiments of the attached Figures. Alternatively, the cable holder posts 13 and 14 attached to the lower shaft engaging member 12 can be relocated to the upper shaft engaging member 4 and a cable guide can be located on the lower shaft engaging member 12. A further alternative is to have the lower shaft engaging member 12 formed in the shape of an inverted W with holes drilled in each outside leg of the W to receive the cable 17 for tightening the apparatus 1 and entirely eliminate the cable holder posts 13 and 14.

One skilled in the art, after reading the above description, can envision other modifications of the alignment indicator clamp apparatus of my invention. Therefore, it is desired that my invention be limited only by the lawful scope of the following claims.

What is claimed is:

1. An alignment indicator clamp apparatus for removably and fixedly attaching an alignment indicator to one of two shafts to be aligned, said apparatus comprising upper and lower shaft engaging members each having a shaft engaging surface, said upper shaft engaging member additionally having opposite the shaft engaging surface thereof a cable tightening mechanism including as a portion thereof at least one post for attaching said alignment indicator, said lower shaft engaging member additionally having cable passage means, said upper and lower shaft engaging members being releasably joined for tightening about said one shaft by a cable having fixed stop means at one end thereof and a slidably adjustable stop means so that passage of said cable through a cable passage means of said lower shaft engaging member located substantially opposite said upper shaft engaging member on said one shaft until stopped by said fixed stop means, then upwardly about the circumference of the shaft through said cable tightening mechanism of said upper shaft engaging member and continuing back through another cable passage means of said lower shaft engaging member with attachment and hand tight securing of said slidably adjustable stop means joins said upper and lower shaft engaging members for subsequent tightening of the cable to removably and fixedly attach said alignment indicator clamp apparatus to said one shaft.

2. The apparatus of claim 1 wherein the upper and lower shaft engaging members are sections of angle iron.

3. The apparatus of claim 1 wherein the upper and lower shaft engaging members are equilateral right angled iron bars.

4. The apparatus of claim 1 wherein said cable tightening mechanism consists of a threaded rod attached to one of said shaft engaging members, said threaded rod having a longitudinal slot therein, a bearing washer and a threaded adjustment knob on said rod so that after passing said cable over said bearing washer and through the slot and then fixing the cable hand tight, the adjustment knob is turned to take up any slack in the cable and solidly fix said clamp apparatus to the shaft to be aligned.

5. The apparatus of claim 1 wherein the cable tightening mechanism is further characterized as having said indicator attachment post as an upper section thereof.

* * * * *